(12) United States Patent
Linna et al.

(10) Patent No.: US 7,644,577 B2
(45) Date of Patent: Jan. 12, 2010

(54) REDUCING AGENT METERING SYSTEM FOR REDUCING NO$_x$ IN LEAN BURN INTERNAL COMBUSTION ENGINES

(75) Inventors: Jan-Roger Linna, Boston, MA (US); Rajiv Gupta, Glen Allen, VA (US); Roberto O. Pellizzari, Groton, MA (US); Gene Garland Faison, Jr., Richmond, VA (US)

(73) Assignee: Philip Morris USA, Inc., Richmond, VA (US)

( * ) Notice: Subject to any disclaimer, the term of this patent is extended or adjusted under 35 U.S.C. 154(b) by 522 days.

(21) Appl. No.: 11/262,605

(22) Filed: Oct. 31, 2005

(65) Prior Publication Data
US 2006/0101811 A1 May 18, 2006

Related U.S. Application Data

(60) Provisional application No. 60/623,375, filed on Oct. 29, 2004.

(51) Int. Cl.
*F01N 3/00* (2006.01)

(52) U.S. Cl. ............ 60/286; 60/295; 60/297; 60/301; 60/303; 239/409; 239/410; 239/585.3; 239/585.4

(58) Field of Classification Search ............ 60/274, 60/286, 295, 297, 301, 303; 239/407, 410, 239/411, 585.1, 585.2, 585.3, 585.4, 587.3
See application file for complete search history.

(56) References Cited

U.S. PATENT DOCUMENTS

| | | | | |
|---|---|---|---|---|
| 5,522,218 A | * | 6/1996 | Lane et al. | ............ 60/274 |
| 5,809,775 A | * | 9/1998 | Tarabulski et al. | ............ 60/274 |
| 5,851,501 A | | 12/1998 | Krutzsch et al. | |
| 5,884,475 A | * | 3/1999 | Hofmann et al. | ............ 60/274 |
| 5,894,728 A | | 4/1999 | Wakamoto | |
| 5,943,858 A | | 8/1999 | Hofmann et al. | |
| 5,968,464 A | | 10/1999 | Peter-Hoblyn et al. | |
| 5,976,475 A | | 11/1999 | Peter-Hoblyn et al. | |
| 6,001,318 A | | 12/1999 | Tillaart et al. | |
| 6,382,600 B1 | | 5/2002 | Mahr | |
| 6,471,927 B2 | | 10/2002 | Hofmann et al. | |
| 6,474,271 B1 | | 11/2002 | Widmer et al. | |
| 6,637,196 B1 | | 10/2003 | Tost | |
| 6,641,785 B1 | | 11/2003 | Neufert et al. | |
| 6,662,553 B2 | | 12/2003 | Patchett et al. | |
| 6,713,030 B1 | | 3/2004 | Chandler et al. | |
| 6,725,651 B2 | * | 4/2004 | Itoh et al. | ............ 60/286 |
| 6,737,033 B1 | | 5/2004 | Hofmann et al. | |
| 6,739,126 B2 | | 5/2004 | Huthwohl | |
| 6,742,330 B2 | | 6/2004 | Genderen | |
| 6,755,014 B2 | | 6/2004 | Kawai et al. | |

(Continued)

*Primary Examiner*—Binh Q. Tran
(74) *Attorney, Agent, or Firm*—Roberts Mlotkowski Safran & Cole, P.C.

(57) ABSTRACT

A reducing agent metering system for delivering reducing agent to a lean burn internal combustion engine. The reducing agent metering system includes a metering system housing, a system for metering vaporized reducing agent to the internal combustion engine, the system positioned within the metering system housing and a system for delivering an atomized stream of liquid reducing agent to the lean burn internal combustion engine, the system positioned within the metering system housing, wherein the reducing agent metering system is operable to transition from metering vaporized reducing agent to delivering an atomized stream of liquid reducing agent to the lean burn internal combustion engine.

29 Claims, 9 Drawing Sheets

U.S. PATENT DOCUMENTS

Figure 1:
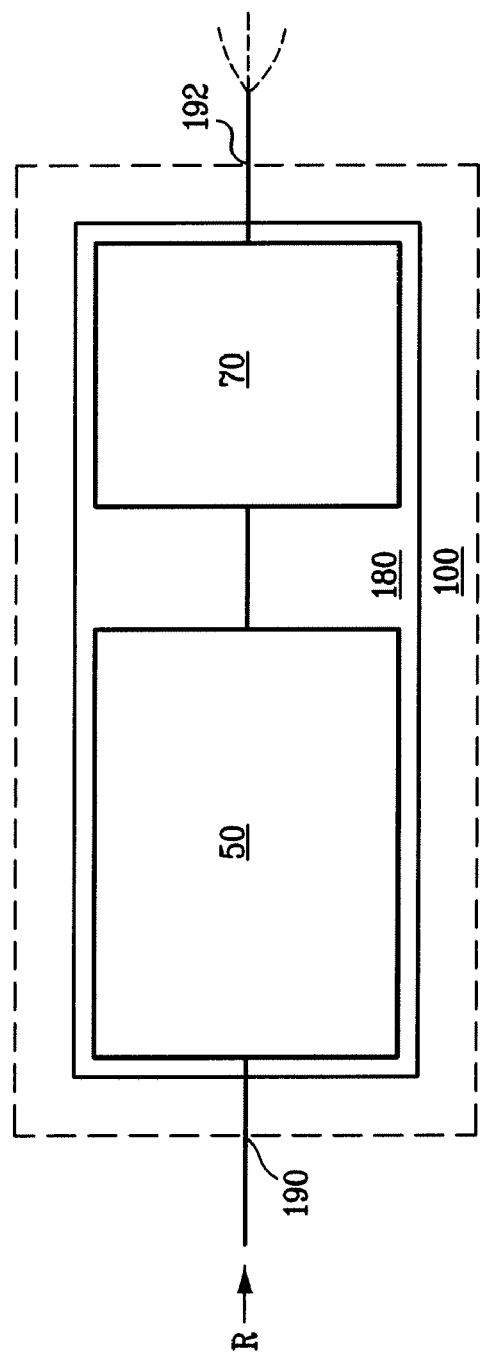

| | | |
|---|---|---|
| 6,759,021 B1 | 7/2004 | Berthold et al. |
| 6,766,817 B2 | 7/2004 | da Silva |
| 6,812,029 B2 | 11/2004 | Ohsuga et al. |
| 6,895,747 B2 * | 5/2005 | Upadhyay et al. ............. 60/286 |
| 7,017,335 B2 * | 3/2006 | Huber et al. .................. 60/286 |
| 7,337,607 B2 * | 3/2008 | Hou et al. ..................... 60/274 |
| 2003/0180674 A1 | 9/2003 | Pellizzari |
| 2003/0230072 A1 | 12/2003 | Megas et al. |
| 2004/0098978 A1 | 5/2004 | Tarabulski et al. |
| 2004/0103643 A2 | 6/2004 | Megas et al. |
| 2004/0115110 A1 | 6/2004 | Ripper et al. |
| 2004/0124259 A1 | 7/2004 | Guezennec et al. |
| 2004/0128982 A1 | 7/2004 | Patchett et al. |
| 2004/0177606 A1 | 9/2004 | Scharsack |
| 2004/0179960 A1 | 9/2004 | Lenke |

* cited by examiner

REDUCING AGENT METERING SYSTEM FOR REDUCING $NO_x$ IN LEAN BURN INTERNAL COMBUSTION ENGINES

RELATED APPLICATIONS

This patent application claims priority to Provisional Application Ser. No. 60/623,375, filed on Oct. 29, 2004, the contents of which are hereby incorporated by reference.

FIELD

The present invention relates generally to combustion exhaust treatment systems, and more particularly to an apparatus and system for $NO_x$ reduction in lean burn internal combustion engines.

BACKGROUND

Diesel engines are well-known to provide significant advantages in fuel efficiency and continue to be the subject of intensive development and further improvements. However, controlling the emission of oxides of nitrogen ($NO_x$) has proven quite challenging, since control techniques tend to increase the emissions of other pollutants or decrease fuel economy. Proposed regulations provide further challenges to manufacturers to achieve good fuel economy and reduce $NO_x$.

In the case of diesel engines, $NO_x$ reduction has typically been achieved through the alteration of engine operating parameters that impact combustion. Among these engine operating parameters, injection timing is one of the most influential factors in controlling $NO_x$ emissions. By retarding the injection timing, significant reductions in $NO_x$ emissions can be achieved. Injection rate also affects $NO_x$ emissions, with increased rates resulting in increased $NO_x$ emissions. Likewise, any change that increases combustion temperature (increased compression ratio, fuel-air ratio, etc.) increases $NO_x$ emissions. Exhaust gas recirculation (EGR) is a method used to reduce combustion temperatures and therefore $NO_x$ emissions. Unfortunately, the use of exhaust gas recirculation increases particulate emissions in diesel engines, limiting the practical level to which it can be used to about 15%.

Three-way catalysts are widely used in gasoline engines to reduce $NO_x$ emissions. To efficiently use such catalysts, the engine must be operated at or near stoichiometry. Since diesel engines are operated under oxygen rich conditions, even at full load, typical gasoline engine exhaust gas catalyst systems are ineffective for reducing $NO_x$. Non-diesel, lean burn engines provide similar challenges in the reduction of $NO_x$ emissions, in that conventional three-way catalyst systems are ineffective. As used herein, the term lean burn is meant to include engines that can be operated with an oxygen concentration greater than the amount required for stoichiometric combustion of a hydrocarbon fuel, (e.g., at least 1% by weight excess oxygen). Such engines include all combustors which combust hydrocarbon fuels to provide heat, e.g., for direct or indirect conversion to mechanical or electrical energy, internal combustion engines of the Otto, Diesel and turbine types, as well as burners and furnaces.

Efforts to reduce $NO_x$ in diesel and other lean burn engines have included a variety of catalytic and non-catalytic techniques. Techniques employing a catalytic reduction method essentially comprise passing the exhaust gas over a catalyst bed in the presence of a reducing gas to convert the $NO_x$ into nitrogen. Non-catalytic techniques include selective non-catalytic reduction (SNCR) systems. Catalytic techniques have included the use of quaternary catalyst reduction systems, hydrocarbon selective catalyst reduction (SCR) systems and urea SCR systems. Since quaternary catalysts have a low nitric oxide reduction efficiency (about 10%), they are not particularly effective. Hydrocarbon SCR systems are known to have a nitric oxide reduction efficiency of about 35%, with a penalty to fuel efficiency of about 3%. Urea SCR systems have a nitric oxide reduction efficiency that can exceed 65%. In view thereof, urea SCR systems have received considerable interest by industry.

SCR systems have been available for years for reducing $NO_x$ emissions from fixed-base sources. SCR systems depend on the use of ammonia, which has safety problems associated with its storage and transport. Urea is safer, but has not been practical for many SCR applications, particularly mobile $NO_x$ sources, due to the difficulty in converting it from a solid or an aqueous form to its active gaseous species.

$NO_x$ reducing catalysts have been developed which are effective over the operating range of the engine. Despite the infrastructure concerns relating to the use of urea in a mobile application, as well as the potentially dangerous risks of ammonia break-through (slip), ammonia SCR systems are becoming the favored choice for mobile applications to meet more stringent $NO_x$ emissions. This is due to the high $NO_x$ conversion percentages, mentioned above, that are possible with ammonia, coupled with the ability to optimize the combustion process for maximum power output with minimum fuel consumption.

Much work has been undertaken to reduce $NO_x$ emissions in diesel engines. As disclosed in U.S. Pat. No. 4,188,364, in order to enable ammonia to react with $NO_x$, at typical combusted gas stream temperatures of a diesel or spark-ignited engine, it is known to mix gaseous ammonia into the combusted gas stream, in proportion to the amount of $NO_x$ contained in the combusted gas stream, and then route the gaseous mixture to a catalytic reactor.

With regard to SCR control systems, U.S. Pat. No. 4,403,473 proposes an ammonia/fuel ratio control system for reducing nitrogen oxide emissions wherein ammonia is metered to the combusted gas stream in a pre-selected proportion to the fuel mass flow rate and in response to the sensed temperature of the combusted gas stream in the reactor being within a pre-selected range.

U.S. Pat. No. 5,116,579 measures the humidity of intake air and one or more operating parameters of engine power, intake air temperature, fuel consumption and exhaust gas temperature to set an ammonia ratio control valve. The molar ratio of ammonia to $NO_x$ is set at less than one to minimize ammonia slip.

U.S. Pat. No. 5,522,218 proposes a combustion exhaust purification system and method for use in relatively large diesel engines. A computer controlled injector intermittently injects an amount of $NO_x$ reducing fluid into the exhaust passageway from the engine. The amount of $NO_x$ reducing fluid said to be introduced corresponds to an amount that will achieve improved $NO_x$ reduction rates for the given engine operating condition and exhaust temperature. A computer periodically senses the engine operating condition and the exhaust temperature, and calculates the injection amount.

With respect to control systems, Japan Publication No. JP-A 55093917 proposes techniques for the detection of exhaust gas flow rate, nitrogen oxide concentration in the exhaust gas, exhaust gas temperature, along with the temperature of the denitration $deNO_x$ catalyst. Through the use of those data and in accordance with the nitrogen oxide rate, a rate of introduction into the exhaust gas is calculated and performed that takes into account the catalytic activity of the catalyst, which is dependent on the catalyst temperature. It has been reported by others, however, that such a method, especially during positive and negative sudden load changes, does not prevent an escape of reducing agent (slip) or nitrogen oxide.

U.S. Pat. No. 5,628,186 proposes a method and apparatus for the controlled introduction of a reducing agent into a nitrogen oxide-containing exhaust gas of an internal combustion engine having a catalytic converter for reducing nitrogen oxide. The method includes detecting at least one operation-relevant parameter of the exhaust gas of the catalytic converter and optionally of the engine to determine the nitrogen oxide rate. An intermediate value is determined for the reducing agent rate as a function of the nitrogen oxide rate. The intermediate value is reduced by a rate of the reducing agent desorbed by the catalytic converter or raised by a rate of the reducing agent adsorbed by the catalytic converter. An apparatus for performing the method includes a control unit. The control unit is intended to adjust a rate of the reducing agent introduced into the exhaust gas as a function of the parameters, while taking into account a rate of the reducing agent adsorbed by the catalytic converter or desorbed by the catalytic converter.

Notwithstanding the advances in hydrocarbon-, urea- and ammonia-based SCR systems, the reducing agent delivery and control systems developed to date have proven to be complicated and/or ineffective to control the SCR system under all engine operating conditions. This problem is particularly acute when the impact of transient $NO_x$ emissions on the SCR system is considered. As may be appreciated, due to the continual variance in engine speed and load, the quantities of nitrogen oxide generated by per unit time and the flow rates and temperatures of the exhaust gas are subject to major fluctuations.

While urea-based SCR systems possess many advantages over hydrocarbon- and ammonia-based systems, it is difficult to rapidly adjust the quantity of reducing agent introduced into the exhaust gas per unit of time during transient conditions. Another difficulty lies in the inability to promote good mixing of the reducing agent with the exhaust gas under all transient conditions. Failure to promote good mixing and rapidly adjust the quantity of reducing agent greatly impacts $NO_x$ reduction efficiencies and can result in ammonia slip. Ammonia slip represents a serious problem, since ammonia is poisonous, and even at a concentration of only about 5 ppm, it represents a considerable odor burden to humans. For that reason, an escape of ammonia must be avoided.

Therefore, there is a need for a safe, economical and effective reducing agent delivery system to address the problems associated with SCR systems, particularly for mobile diesel and other lean burn engines.

SUMMARY

In view thereof, one aspect of the present invention is to provide a reducing agent metering system for an exhaust after-treatment system of a lean burn internal combustion engine. The reducing agent metering system includes a metering system housing, a system for metering vaporized reducing agent to the internal combustion engine, the system positioned within the metering system housing and a system for delivering an atomized stream of liquid reducing agent to the lean burn internal combustion engine, the system positioned within the metering system housing, wherein the reducing agent metering system is operable to transition from metering vaporized reducing agent to delivering an atomized stream of liquid reducing agent to the lean burn internal combustion engine. In another aspect, the reducing agent metering system further includes a plurality of capillary flow passages in fluid communication with liquid reducing agent, and a heat source arranged along the plurality of capillary flow passages. The heat source is operable to heat liquid reducing agent in the plurality of capillary flow passages sufficiently to deliver a stream of vaporized reducing agent. The reducing agent metering system is preferably operated to deliver the stream of vaporized reducing agent to the exhaust stream, upstream of a reducing catalyst.

In yet another aspect, provided is a system for reducing $NO_x$ emissions from an exhaust stream of a lean burn internal combustion engine. The system includes an exhaust passageway having a first end and a second end, the first end in communication with at least a portion of the exhaust stream of the lean burn internal combustion engine, a $deNO_x$ catalyst positioned between the first end and the second end of the exhaust passageway, a reducing agent metering system mounted within the exhaust passageway and upstream of the $deNO_x$ catalyst, the reducing agent metering system including a metering system housing, a system for metering vaporized reducing agent to the lean burn internal combustion engine, the system positioned within the metering system housing, and a system for delivering an atomized stream of liquid reducing agent to the lean burn internal combustion engine, the system positioned within the metering system housing, a source of reducing agent, the source of reducing agent in fluid communication with the reducing agent metering system, means for determining an operating condition of the lean burn internal combustion engine, means for measuring the temperature of the exhaust stream within the exhaust passageway; and a computer in communication with the operating condition determining means, the temperature measuring means and the reducing agent metering system, and being capable of controlling the metering system so as to inject the $NO_x$ reducing agent into the exhaust passageway.

In still yet another aspect, provided is a method of reducing $NO_x$ emissions from an exhaust stream flowing through an exhaust passageway of a lean burn internal combustion engine having a $NO_x$ emissions reducing system, comprising the steps of: predetermining optimized amounts for the metering of a reducing agent over a portion of an operating range of the lean burn internal combustion engine and over a range of exhaust temperatures, positioning a $deNO_x$ catalyst in the exhaust passageway, measuring the temperature of the exhaust stream, determining the operating condition of the engine, determining whether the engine is in a fully warmed condition warm, computing an amount for a subsequent cycle time period based upon the predetermined optimized amounts, the measured temperature of the exhaust, and the determined operating condition of the lean burn internal combustion engine and metering the optimized amount of the reducing agent, wherein the step of metering the optimized amount of the reducing agent employs a reducing agent metering system mounted within the exhaust passageway and upstream of the $deNO_x$ catalyst, the reducing agent metering system including a metering system housing, a system for metering vaporized reducing agent to the lean burn internal combustion engine, the system positioned within the metering system housing and a system for delivering an atomized stream of liquid reducing agent to the lean burn internal combustion engine, the system positioned within the metering system housing the reducing agent metering system operable to transition from metering vaporized reducing agent to delivering an atomized stream of liquid reducing agent to the lean burn internal combustion engine in response to the step of determining whether the engine is in a fully warmed condition.

In a further aspect, provided is an automobile. The automobile includes a lean burn internal combustion engine positioned within an automobile body and a system for reducing $NO_x$ emissions from an exhaust stream of a lean burn internal combustion engine, including: an exhaust passageway having a first end and a second end, the first end in communication with at least a portion of the exhaust stream of the lean burn internal combustion engine, a $deNO_x$ catalyst positioned between the first end and the second end of the exhaust passageway, a reducing agent metering system mounted within the exhaust passageway and upstream of the $deNO_x$ catalyst, the reducing agent metering system including a metering system housing, a system for metering vaporized reducing agent to the lean burn internal combustion engine, the system positioned within the metering system housing and a system for delivering an atomized stream of liquid reducing agent to the lean burn internal combustion engine, the system positioned within the metering system housing, a source of reducing agent, the source of reducing agent in fluid communication with the reducing agent metering system, means for determining an operating condition of the lean burn internal combustion engine, means for measuring the temperature of the exhaust stream within the exhaust passageway and a computer in communication with the operating condition determining means, the temperature measuring means and the reducing agent metering system, and being capable of controlling the metering system so as to inject the $NO_x$ reducing agent into the exhaust passageway.

Each capillary passage can be formed within a capillary tube and the heat source can include a resistance heating element or a section of the tube heated by passing electrical current therethrough. The reducing agent supply can be arranged to deliver pressurized or non-pressurized liquid reducing agent to the flow passage. The reducing agent metering system can provide a stream of vaporized reducing agent that mixes with air and forms an aerosol having a mean droplet size of 25 μm or less.

BRIEF DESCRIPTION OF THE DRAWINGS

The invention will now be described in more detail with reference to preferred forms of the invention, given only by way of example, and with reference to the accompanying drawings, in which:

FIG. 1 shows a reducing agent metering system, in block diagram form, in accordance with a preferred form;

FIG. 2 is a chart illustrating the trade-off between minimizing the power supplied to the metering system and minimizing the warm-up time associated with the metering system for different heated masses;

FIG. 3 presents a schematic of a $NO_x$ reduction system, in accordance with a preferred form;

FIG. 4 presents capillary heater tuning results for a solution of 20% urea in water;

FIG. 5 presents particle size distribution for a 20% urea in water solution;

FIG. 6 shows an isometric view of a reducing agent metering system having an electronically heated capillary bundle positioned upstream of a solenoid activated metering valve, in accordance with another preferred form of the injector;

FIG. 7 is a partial cross-sectional side view of the multiple capillary reducing agent metering system of FIG. 6;

FIG. 8 is an isometric partial cross-sectional view of the multiple capillary reducing agent metering system of FIG. 6 and FIG. 9 is an enlarged partial cross-sectional view showing in detail the valve assembly of the multiple capillary reducing agent metering system of FIG. 6.

DETAILED DESCRIPTION OF THE PREFERRED EMBODIMENTS

Reference is now made to the embodiments illustrated in FIGS. 1-5 wherein like numerals are used to designate like parts throughout.

As used herein, the term lean burn is meant to include engines that can be operated with an oxygen concentration greater than the amount required for stoichiometric combustion of a hydrocarbon fuel, (e.g., at least 1% by weight excess oxygen). Such engines include all combustors which combust hydrocarbon fuels to provide heat, e.g., for direct or indirect conversion to mechanical or electrical energy, internal combustion engines of the Otto, Diesel and turbine types, as well as burners and furnaces.

In a urea-based SCR system of the type employed in lean burn internal combustion engines, including diesels, a urea in water solution is delivered into the exhaust upstream of the SCR catalyst. The urea present in the urea in water solution thermally decomposes into ammonia and is used by the downstream SCR catalyst to reduce $NO_x$ emissions. In conventional reducing agent delivery systems, it is important to overall system performance to provide sufficient residence time in the exhaust stream to permit thermal decomposition of the urea and enable good mixing with the exhaust stream.

As is well-known, urea requires significant heat in order to vaporize and decompose. As such, it is often necessary to provide an excess of urea in water solution to achieve adequate system performance. As a result of the need for a hot exhaust gas stream to promote thermal decomposition, conventional urea-based systems must often be disabled during cold-start and warm-up. In the reducing agent metering system disclosed herein, the metering system heats the urea in water solution to a level just below the point of thermal decomposition, allowing urea decomposition to rapidly take place downstream of the metering system, even during the cold-start and warm-up period.

From the standpoint of space utilization and system packaging, a multiple capillary reducing agent metering system having a downstream metering valve has particular utility in the urea-based SCR systems described herein. The multiple capillary reducing agent metering system has a plurality of capillary flow passages, each capillary flow passage capable of heating a urea in water solution so that vaporized urea is supplied, as needed. Advantageously, the multiple capillary reducing agent metering system disclosed herein requires a very short warm-up period and operates at relatively low power levels.

The reducing agent metering system designs provided herein are specifically aimed at meeting several design requirements which include: providing an acceptable pressure drop across the metering system body, providing acceptable urea flow rates, providing short warm-up times, providing a linear relationship between duty cycle and the vaporized flow of urea and the ability to operate at low power levels.

During cold-start and warm-up, the capillary reducing agent metering system meters urea that has been vaporized into the exhaust flow upstream of the SCR catalyst. Its rapid warm-up characteristics enable high system efficiencies to be achieved earlier than with convention systems.

The system of the present invention may also be utilized with gasoline direct injection engines (GDI). In GDI engines, the fuel is injected directly into the cylinder as a finely atomized spray that evaporates and mixes with air to form a premixed charge of air and vaporized fuel prior to ignition. Contemporary GDI engines operate with stratified charge at part load to reduce the pumping losses inherent in conventional indirect injected engines. A stratified-charge, spark-ignited engine is typically operated as a lean burn engine for improved fuel economy and reduced emissions. Preferably, an overall lean mixture is formed in the combustion chamber, but is controlled to be stoichiometric or slightly fuel-rich in the vicinity of the spark plug at the time of ignition. The stoichiometric portion is thus easily ignited, and this in turn ignites the remaining lean mixture.

A reducing agent injection system of the type disclosed herein includes a plurality of capillary-sized flow passages through which reducing agent flows before being injected into an exhaust system after-treatment system of a lean burn internal combustion engine, such as a diesel engine. Capillary-sized flow passages can be provided with a hydraulic diameter that is preferably less than 2 mm, more preferably less than 1 mm, and most preferably less than 0.75 mm. Hydraulic diameter is used in calculating fluid flow through a fluid carrying element. Hydraulic radius is defined as the flow area of the fluid-carrying element divided by the perimeter of the solid boundary in contact with the fluid (generally referred to as the "wetted" perimeter). In the case of a fluid carrying element of circular cross section, the hydraulic radius when the element is flowing full is $(\pi D^2/4)/\pi D = D/4$. For the flow of fluids in noncircular fluid carrying elements, the hydraulic diameter is used. From the definition of hydraulic radius, the diameter of a fluid-carrying element having circular cross section is four times its hydraulic radius. Therefore, hydraulic diameter is defined as four times the hydraulic radius.

When heat is applied along the capillary passageways, the liquid reducing agent that enters the flow passages is converted to a vapor as it travels along the passageway. The reducing agent exits the capillary passageways as a vapor, which may optionally contain a minor proportion of heated liquid reducing agent that has not been vaporized. Although it may be difficult to achieve 100% vaporization under all conditions due to the complex physical effects that take place, nonetheless complete vaporization is desirable. These complex physical effects include variations in the boiling point of the reducing agent since the boiling point is pressure dependent and pressure can vary within the capillary flow passage. Thus, while it is believed that a major portion of the reducing agent reaches the boiling point during heating in the capillary flow passage, some of the liquid reducing agent may not be heated enough to be fully vaporized with the result that a portion of the liquid reducing agent passes through the outlet of the capillary flow passage along with the vaporized fluid.

From the standpoint of metering a precise volume of reducing agent per pulse, it is highly desirable to meter reducing agent that is either in vapor form or liquid form. As may be appreciated by those skilled in the art, should two-phase flow occur in the region of the metering valve, the actual quantity of reducing agent being metered with each pulse is exceedingly difficult to ascertain and highly variable. As such, should excessive quantities of reducing agent be metered, ammonia slip or poor $NO_x$ reduction system efficiencies could occur.

Each capillary-sized fluid passage is preferably formed within a capillary body such as a single or multilayer metal, ceramic or glass body. Each passage has an enclosed volume opening to an inlet and an outlet, either of which, or both, may be open to the exterior of the capillary body or may be connected to another passage within the same body or another body or to fittings. The heater can be formed using a portion of the body; for example, a section of a stainless steel or nickel-chromium alloy, such as that sold under the trademark Inconel® (a registered trademark of the International Nickel Corporation) tube or the heater can be a discrete layer or wire of resistance heating material incorporated in or on the capillary body. Each fluid passage may be any shape comprising an enclosed volume opening to an inlet and an outlet and through which a fluid may pass. Each fluid passage may have any desired cross-section with a preferred cross-section being a circle of uniform diameter. Other capillary fluid passage cross-sections include non-circular shapes such as triangular, square, rectangular, oval or other shape and the cross section of the fluid passage need not be uniform. In the case where the capillary passages are defined by metal capillary tubes, each tube can have an inner diameter of 0.01 to 3 mm, preferably 0.1 to 1 mm, most preferably 0.3 to 0.75 mm. Alternatively, the capillary passages can be defined by transverse cross sectional area of the passage, which can be $8 \times 10^{-5}$ to 7 mm$^2$, preferably $8 \times 10^{-3}$ to $8 \times 10^{-1}$ mm$^2$ and more preferably $7 \times 10^{-2}$ to $4.5 \times 10^{-1}$ mm$^2$. Many combinations of multiple capillaries, various pressures, various capillary lengths, amounts of heat applied to the capillary, and different cross-sectional areas may suit a given application.

The liquid reducing agent can be supplied to the capillary flow passage under a pressure of at least 10 psig, preferably at least 20 psig. In the case where each capillary flow passage is defined by the interior of a stainless steel or Inconel® alloy, the tube may have an internal diameter of approximately 0.020 to 0.030 inches and a length of approximately 1 to 3 inches. The reducing agent is preferably supplied to the capillary passageway at a pressure of 100 psig or less to achieve requisite mass flow rates. With two to four capillary passageways of the type described herein, a sufficient flow of vaporized reducing agent can be provided to ensure high SCR catalyst efficiencies. It is important that each capillary tube be characterized as having a low thermal inertia, so that each capillary passageway can be brought up to the desired temperature for vaporizing the reducing agent very quickly, preferably within 2.0 seconds, more preferably within 0.5 second, and most preferably within 0.1 second, which is beneficial in applications involving engine warm-up. The low thermal inertia also provides advantages during normal operation of the engine, such as by improving the responsiveness of the SCR exhaust after-treatment system to sudden changes in engine loads.

In order to meter reducing agent through the low thermal inertia capillary passages described herein, a valve arrangement effective to regulate vapor flow from the distal end is required. Because of the small thermal mass of the capillary flow passages contemplated herein, the valve arrangement used to regulate vapor flow must be designed to add minimal thermal mass to the heated system so that warm-up time and effectiveness is not degraded. Likewise, the surface area wetted by the reducing agent must be minimized so that the vaporized reducing agent does not re-condense on contact and jeopardize the performance of the SCR exhaust after-treatment system. Advantageously, the vapor flow path through the capillary flow passages is actively heated so that the working fluid is in the vapor phase upon coming into contact with the valve. It is preferred that the valve itself not be actively heated.

Referring now to FIG. 1, a reducing agent metering system 100 for vaporizing liquid reducing agent drawn from a source of liquid reducing agent R, is shown in schematic form. The reducing agent metering system 100 includes a reducing agent metering system housing 180, a system for metering vaporized reducing agent 50 to an exhaust after-treatment system of a lean burn internal combustion engine (see FIG. 3), the system 50 located within the reducing agent metering system housing 180, and a system for delivering an atomized stream of liquid reducing agent 70, positioned downstream of the system for metering vaporized reducing agent 50. The system for delivering an atomized stream of liquid reducing agent 70 relies upon the system for metering vaporized reducing agent 50, located upstream, for feeding liquid reducing agent thereto and metering same. In the liquid mode of operation, no vaporization occurs within the system for metering vaporized reducing agent 50, as this is adequately achieved within the exhaust system in an effective manner.

Reducing agent metering system 100 is operable to transition from metering vaporized reducing agent to delivering an atomized stream of liquid reducing agent. Reducing agent metering system 100 has an inlet 190 for admitting reducing agent R and an outlet 192. Detail of a form of metering system having utility in the practice of the present invention is shown in U.S. application Ser. No. 10/841,718, filed on May 5, 2004, the contents of which are incorporated by reference in their entirety for all that is disclosed. Should a form of metering system having a metering valve positioned upstream of one or more capillary passages be desired for use in the practice of the present invention, such a design is disclosed in U.S. application Ser. No. 10/143,435, filed on May 10, 2002, the contents of which are incorporated by reference in their entirety for all that is disclosed.

Figure 2:
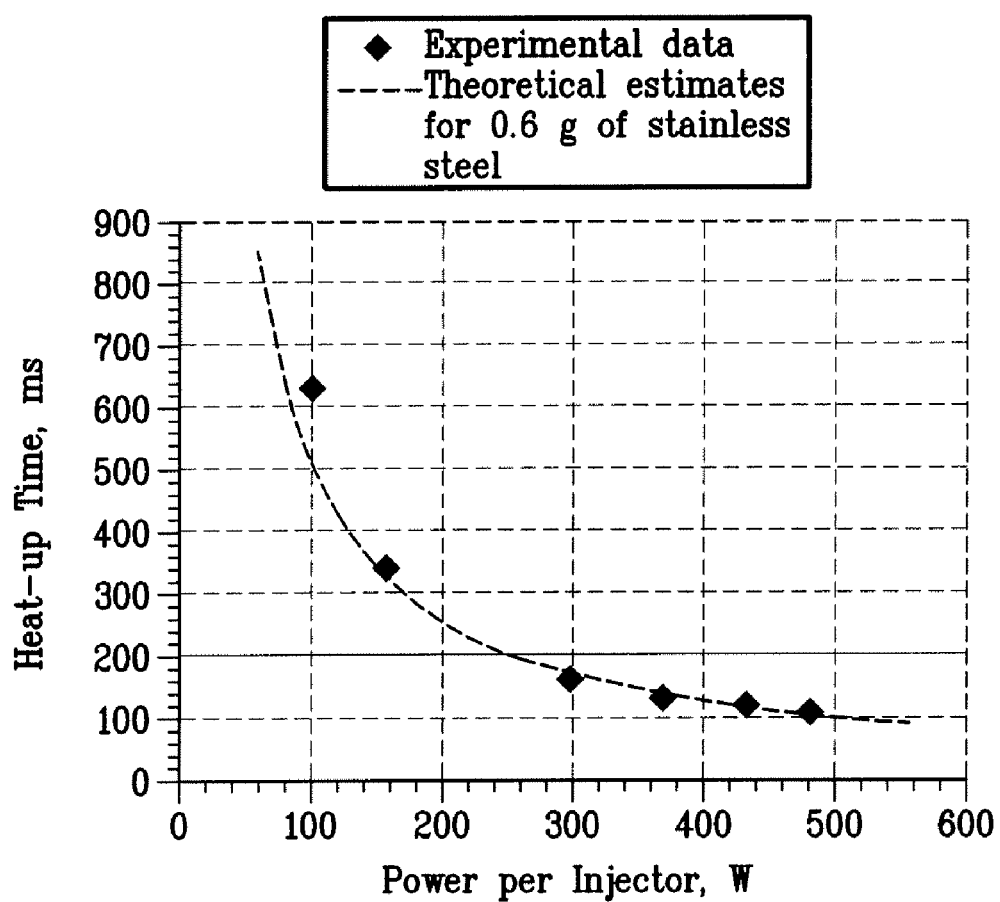

To achieve vaporization when the engine is cold, there exists a tradeoff between minimizing the power supplied to the reducing agent metering system for heating and minimizing the associated warm-up time, as shown in FIG. 2. As may be appreciated, the power available to heat the reducing agent metering system is limited to the available battery power. As shown in FIG. 2, the power requirement during the initial heat-up period can be traded-off for even quicker heating times; for example, a start-up power of 300 W will bring the reducing agent metering system to target temperature in approximately 160 ms.

Referring again to FIG. 1, the reducing agent metering system 100 can produce vaporized streams of reducing agent, which condense in air to form a mixture of vaporized reducing agent, droplets, and air commonly referred to as an aerosol. Compared to the conventional delivery systems utilized in diesel exhaust after-treatment systems that deliver sprays comprised of droplets in the range of 150 to 200 µm Sauter Mean Diameter (SMD), the aerosols produced by the reducing agent metering system disclosed herein have an average droplet size of less than 50 µm SMD, preferably less than 25 µm SMD and still more preferably less than 15 µm SMD.

The difference between the droplet size distributions of a conventional reducing agent delivery system and the reducing agent metering system disclosed herein is particularly critical during cold-start and warm-up conditions. Specifically, using a conventional delivery system to meter reducing agent, relatively cold exhaust system components necessitate the use of higher levels of reducing agent such that a sufficient fraction results in undesirable ammonia slip, in the case of urea-based systems, or disabling the reducing agent injector altogether. Conversely, the vaporized reducing agent and fine droplets of reducing agent produced by the metering system disclosed herein more readily decompose into ammonia, eliminating the need to operate at excessively high levels of reducing agent and risking ammonia slip. The elimination of breakthrough combined with more precise control afforded by the use of the reducing agent metering system disclosed herein can result in greatly reduced cold start $NO_x$ emissions compared to those produced by engines employing conventional exhaust after-treatment systems.

Reducing agent can be supplied to the metering system at a pressure of less than 100 psig, preferably less than 70 psig, more preferably less than 60 psig and even more preferably less than 45 psig. It has been shown that this metering system produces vaporized reducing agent that forms a distribution of aerosol droplets that mostly range in size from 2 to 30 µm SMD, with an average droplet size of about 5 to 15 µm SMD, when the vaporized reducing agent is condensed in air at ambient temperature. The preferred size of droplets to achieve rapid and nearly complete vaporization is less than about 25 µm. This result can be achieved by applying approximately 100 to 400 W, e.g., 200 W of electrical power to the capillary bundle. Alternatives for heating the tube along its length could include inductive heating, such as by an electrical coil positioned around the flow passage and, after the exhaust system reaches normal operating temperatures, the exhaust gases themselves can provide sufficient heat to provide proper decomposition of the reducing agent. After a certain period of time, often less than approximately 60 seconds from starting the engine, the power used to heat the capillaries can be turned off and liquid injection initiated.

Figure 3:
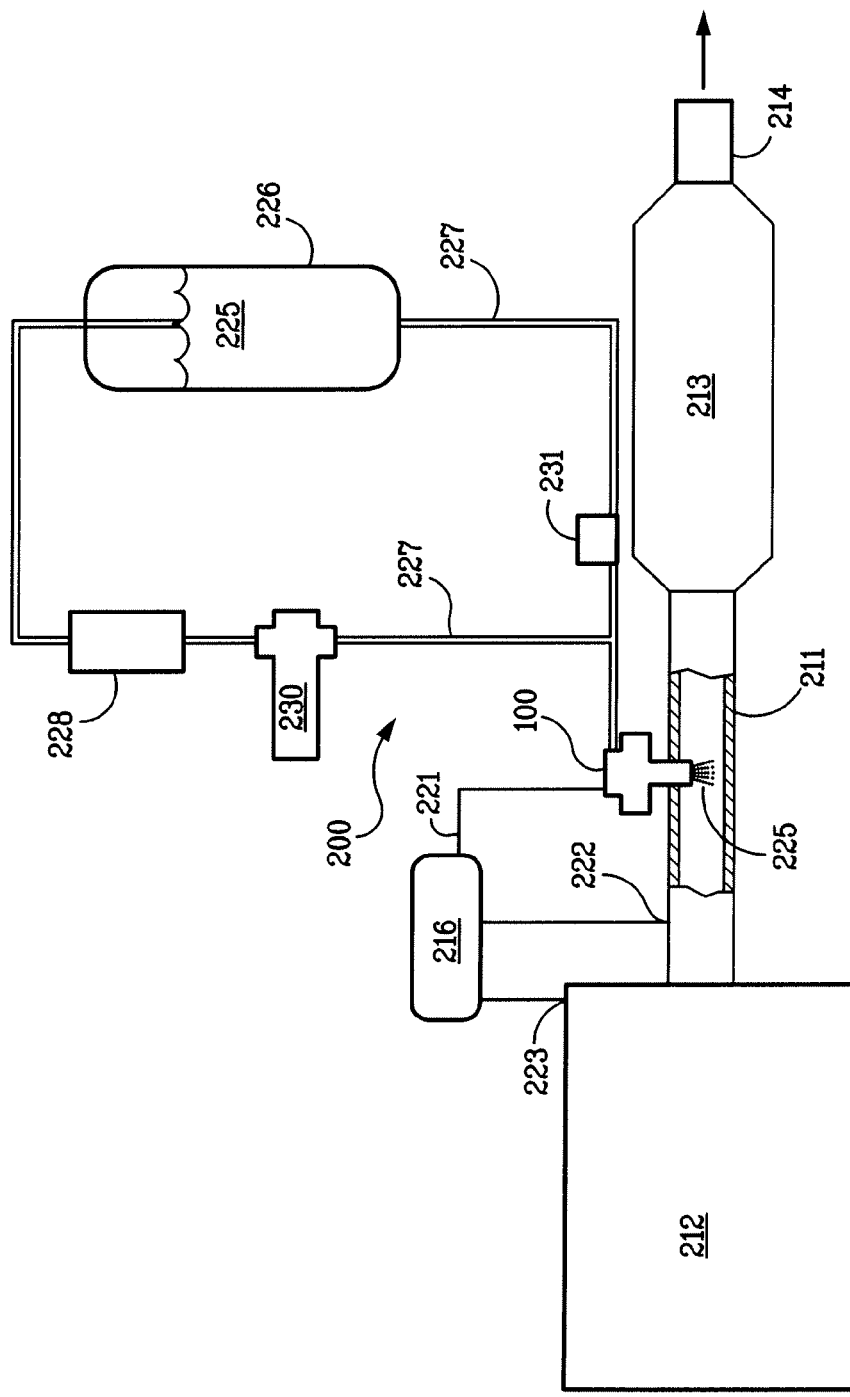

Referring now to FIG. 3, a system for the reduction of $NO_x$ levels from the exhaust of a lean burn internal combustion engine 200, according to a preferred form, is shown in connection with a lean burn internal combustion engine 212, such as a diesel engine. Exhaust exits engine 212 via exhaust passageway 211 and flows downstream to catalytic converter 213, exiting at outlet 214. Catalytic converter 213 includes a $deNO_x$ catalyst, which may advantageously be a zeolite catalyst such as ZSM-5, a precious metal-based catalyst, or a combination thereof. As may be appreciated by those skilled in the art, it may also be desirable to include an oxidation catalyst of a type well-known, the oxidation catalyst positioned downstream of the $deNO_x$ catalyst. As also may be appreciated by those skilled in the art, in the case of a lean burn diesel engine, the inclusion of a three-way catalyst between the $deNO_x$ and oxidation catalysts can aid in the reduction of undesirable nitrogen compounds present after the exhaust passes through the $deNO_x$ catalyst.

As exhaust gases leave engine 212, an amount of a reducing agent, in particular a urea in water blend, is metered into exhaust passageway 211 through the use of reducing agent metering system 100. The use of the preferred urea in water reducing agent can enable the reduction of greater than 90% of $NO_x$ compounds as measured after the $deNO_x$ catalyst. The exhaust gases then pass through the oxidation catalyst (not shown) which serves to reduce the level of unburned HC.

In operation, the reducing agent metering system 100 introduces an optimized amount of a urea in water blend, that amount dependent upon the exhaust temperature and the operating condition of engine 212. By "optimized amount" is meant that amount which will produce the largest overall $NO_x$ reduction for a given exhaust temperature and operating condition without incurring ammonia breakthrough or slip. This is accomplished by utilizing a computer 216 that has the ability to control reducing agent metering system 100. Computer 216 is operatively connected using wiring harness 221. Computer 216 periodically determines the exhaust temperature via temperature sensor 222, and monitors the operating condition of engine 212 via sensor 223. As may be appreciated, in motor vehicle applications, it is often desirable for computer 216 to periodically determine the operating condition of the vehicle, such as engine rpm, engine load and vehicle speed.

As indicated above, a urea in water blend is preferred for use in the practice of the present invention. However, as is understood by those of ordinary skill in the art, any suitable $NO_x$ reducing agent may also be employed. As is preferred, the urea in water blend 225 is stored in tank 226 and transferred to reducing agent metering system 100 via conduit 227. A pump 230 transfers reducing agent to conduit 227 while pressure regulator 231 maintains the fluid pressure on reducing agent metering system 100 at a predetermined level. The reducing agent passes through filter 228 on its way to reducing agent metering system 100, with a portion being recirculated through regulator 231, back to tank 226, when system 200 is in operation.

Although it is known that the $NO_x$ concentration of the exhaust is a function of engine operating condition, the relationship of these variables is known to vary between engines. Additionally, the chemical reactions resulting in $NO_x$ reduction are sensitive to exhaust temperature, a relationship known to be non-linear. As a result, it may be preferred to gather empirical data for a given engine for subsequent storage in a memory location within computer 216. Thus, through the use of an algorithm, computer 216 can periodically adjust the reducing agent amount of reducing agent metering system 100 to correspond to an optimized amount based upon the sensed exhaust temperature and engine operating condition.

The empirical data is then converted into pulse width and duty cycle values. In this way, the computer 216 senses the engine's operating condition, measures the exhaust temperature, and determines an optimized pulse width and duty cycle from a look-up table stored in memory. In some applications it may be desirable to convert the empirical data into mathematical equations that are utilized by the computer as an alternative to the look-up. In such a case, the pulse width and duty cycle would be calculated using the function utilizing the sensed engine operating condition and exhaust temperature.

In operation, the computer determines whether the engine is on and whether it is warm. If the engine is cranking or not yet warm, the computer initiates the heating of the capillary passages of the reducing agent metering system 100. Next, the computer reads the engine operating condition from the engine sensor 223, reads the exhaust temperature from temperature sensor 222 and computes the optimized injection amount as discussed above. If the injection amount is greater than zero, the pump is activated. If the pump is on, the computer commands the reducing agent metering system to inject an optimized amount of reducing agent.

As disclosed in U.S. application Ser. No. 10/284,180, filed on Oct. 31, 2002, the contents of which are incorporated by reference in their entirety, the resistance of the capillary flow passages is used as a feedback measurement to determine the appropriate adjustment in power to the capillary flow passages to maintain the target ratio of measured resistance to cold capillary flow passage resistance ($R/R_o$). This technique is particularly advantageous when used to ensure that high quality vapor is injected into the exhaust stream throughout the cold-start and warm-up period. An analog control algorithm may be employed using a PID controller wherein the resistance of the capillary flow passages in a previous time-step is used as the basis for a finite correction to the power supplied to the capillary flow passages in the current time-step. Through such an analog control methodology, the power supplied to the capillary flow passages may span the entire spectrum from zero to the maximum allowable value. However, ideally, the power to the capillary flow passages will be significantly less than the available power such that the control algorithm can effectively respond to sudden changes. For fully-warmed operation, the capillaries are left unheated and the reducing agent metering system functions much like a conventional metering valve.

Figure 6:
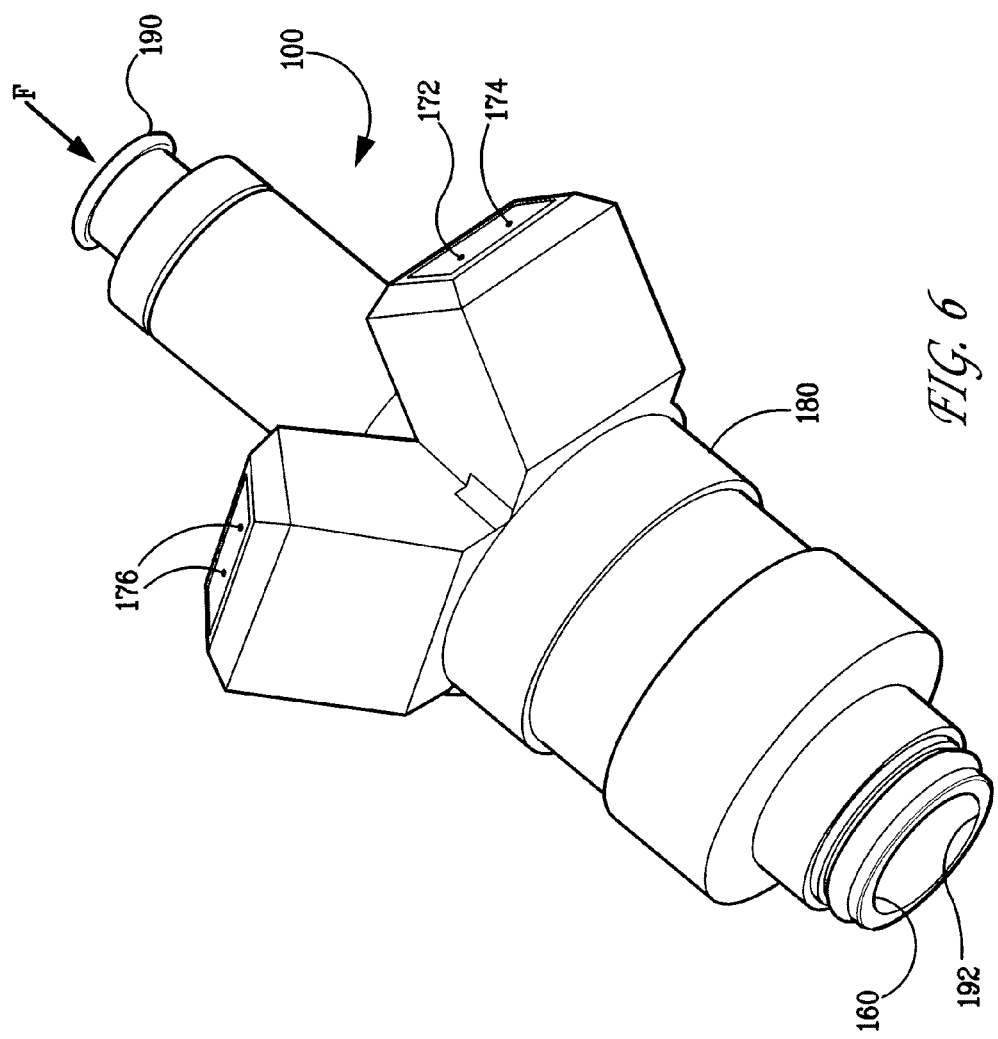
Figure 7:
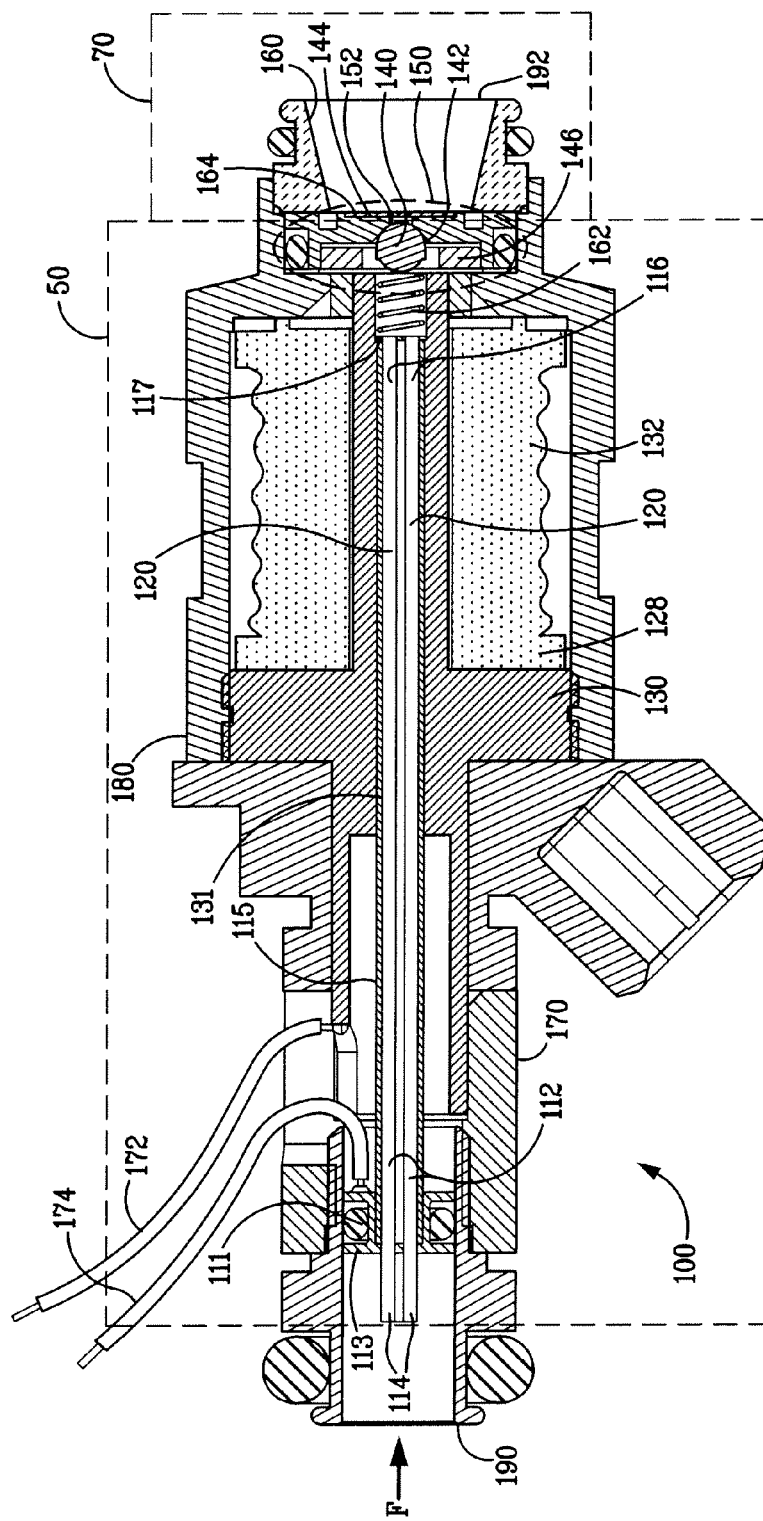
Figure 8:
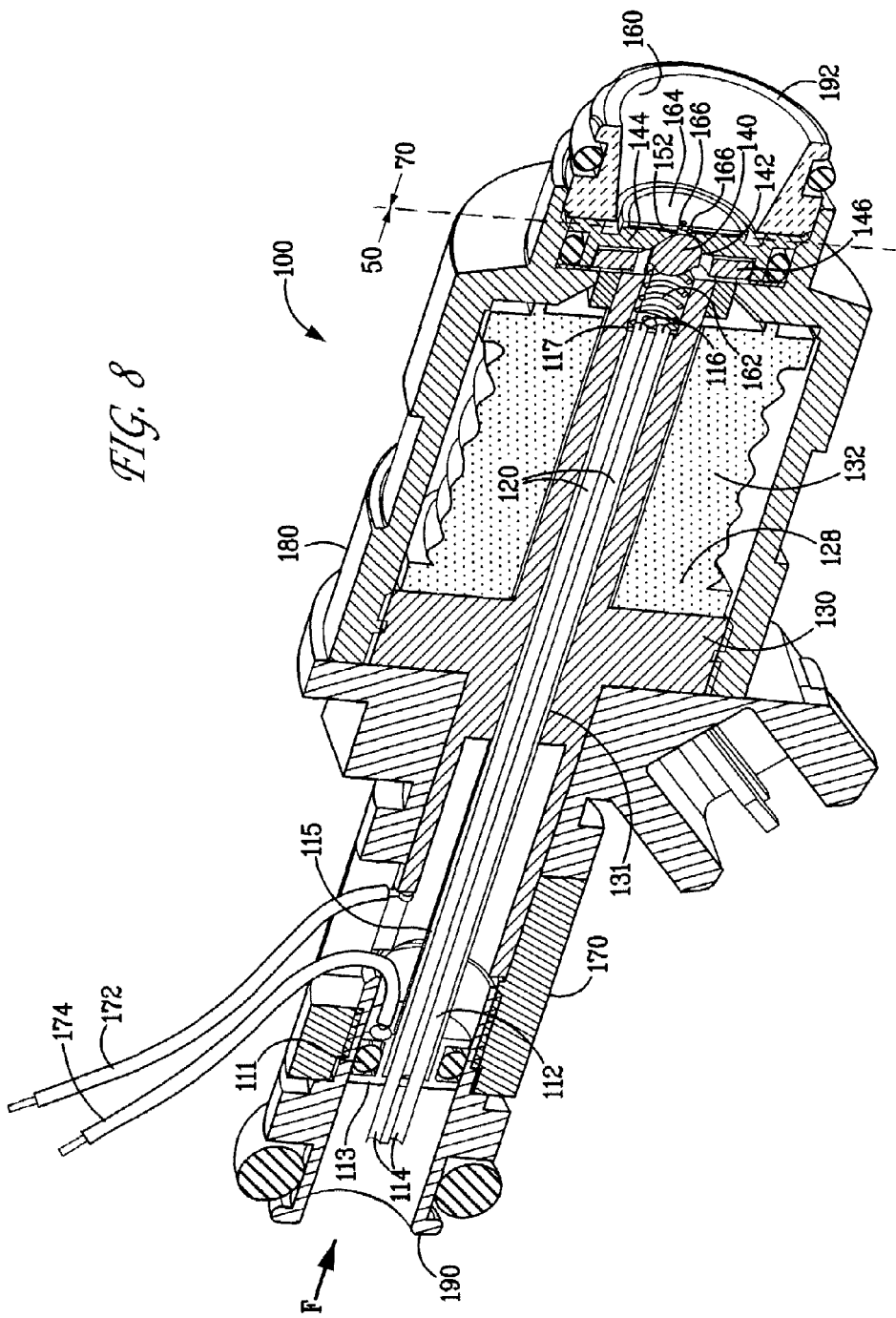

FIGS. 6-9 present a reducing agent metering system 100 for vaporizing reducing agent drawn from a source R, in accordance with a preferred form of the present invention. The reducing agent metering system 100 includes a housing 180, a system for metering vaporized reducing agent 50, the system 50 positioned within housing 180, and a system for delivering an atomized stream of reducing agent 70, positioned downstream of the system for metering vaporized reducing agent 50. As shown in FIGS. 6-8, the system for delivering an atomized stream of reducing agent 70 relies upon the system for metering vaporized reducing agent 50, located upstream, for feeding liquid vaporized thereto and metering same. As will be described in more detail below, in the liquid mode of operation, no vaporization occurs within the system 50. Reducing agent metering system 100 has an inlet 190 for admitting reducing agent R and an outlet 192.

As shown in detail in FIGS. 7 and 8, one form of the system for metering vaporized reducing agent 50 possesses a ball-in-cone valve assembly 144. The system for metering vaporized reducing agent 50 also includes a capillary bundle 115 having a plurality of capillary flow passages 112, each having an inlet end 114 and an outlet end 116, with the inlet end 114 in fluid communication with the liquid reducing agent source R for introducing the liquid reducing agent in a liquid state into the capillary flow passages 112. The capillary bundle 115 is positioned within the central bore of the housing 180 and intermediate housing 130.

Capillary bundle 115 is shown having a plurality of capillary flow passages 112, each having an inlet end 114 positioned by inlet O-ring retainer 113 and an outlet end 116 terminating in a disc 117 and held in position by intermediate housing 130. The inlet retainer 113 is held in place by the rubber O-ring 111 that seals against flow from source R that is in fluid communication with inlet end 114. A plastic coupling 170 attaches the inlet section 190 and inlet of the capillary bundle 115 to the intermediate housing 130. In one preferred embodiment, the capillary bundle 115 is surrounded by a ceramic sleeve 131. It is contemplated that, when metering systems of the type described herein are produced in high volume, rubber O-ring 111 may be replaced by a suitably compliant metal ring that would be affixed by laser welding or the like. As may be appreciated, it is necessary that such a ring be compliant in view of the fact that capillary bundle 115 incurs an element of growth during heating.

The system for metering vaporized reducing agent 50 also includes a heat source 120 arranged along each capillary flow passage 112. As is preferred, each heat source 120 is provided by forming capillary flow passage 112 from a tube of electrically resistive material, a portion of each capillary flow passage 112 forming a heater element when a source of electrical current is connected to the tubes as discussed herein below.

Reducing agent metering system 100 advantageously functions in three distinct modes: a full vaporization mode, a flash vaporization mode and an atomized liquid mode. In the full vaporization mode, each heat source 120 is operable to heat the liquid reducing agent in each capillary flow passage 112 to a sufficient level to change from a liquid state to a vapor state and deliver a stream of vaporized reducing agent from the outlet end 116 of each capillary flow passage 112. As may be appreciated, this method of vapor delivery within the body of the reducing agent metering system minimizes the volume of material that comes into contact with the vaporized reducing agent and, therefore, also minimizes the thermal mass that must be heated in order to prevent premature condensation of the vapor. Under conditions wherein sufficient pressure drop exists, advantageously, each heat source 120 may heat the liquid reducing agent in each capillary flow passage 112 to a sufficient level so that flash vaporization occurs on exiting the orifice 152 and results in a stream of vaporized reducing agent at orifice 152.

In the flash vaporization mode of operation, the reducing agent is not heated to a fully vaporized state within capillary passage 112. As will be described in more detail below, the prevailing pressure drop across ball-in-cone valve assembly 144 is utilized to vaporize a liquid reducing agent that has been heated to a point below the temperature required to vaporize the reducing agent within capillary passage 112.

Capillary bundle 115 may consist of one or more thin-walled capillary flow passages 112. In this embodiment, they are of about 0.028-0.029 in. (0.07 cm) ID and 0.032 in. (0.08 cm) OD. Capillary flow passages 112 may be constructed from stainless steel or annealed Inconel® 600 alloy tubes, each having a heated length 120 of from about 1.25 in. (3.17 cm) to about 2.50 in. (6.35 cm). When current is supplied to capillary bundle 115, the heated length of each capillary passage 112 becomes hot.

Currently, a preferred version of bundle 115 is comprised of four tubes of 18/8 stainless steel (AISI Type 304) having a 0.029 in. (0.074 cm) ID, a 0.032 in. (0.08 cm) OD, and a heated length of 2.00 in. (5.1 cm). Optimum power level for the bundle of four is in the range of 90-120 watts per 100-150 mg/sec of average flow. The ceramic tube 131 is made of 94% alumina with an ID of 0.085 in. (0.22 cm) encompassing the bundle 115 and an OD of 0.104 in. (0.26 cm). This component provides both electrical and thermal insulation for the capillary tubes, but the primary purpose is to provide electrical insulation from the housing 130.

Figure 9:
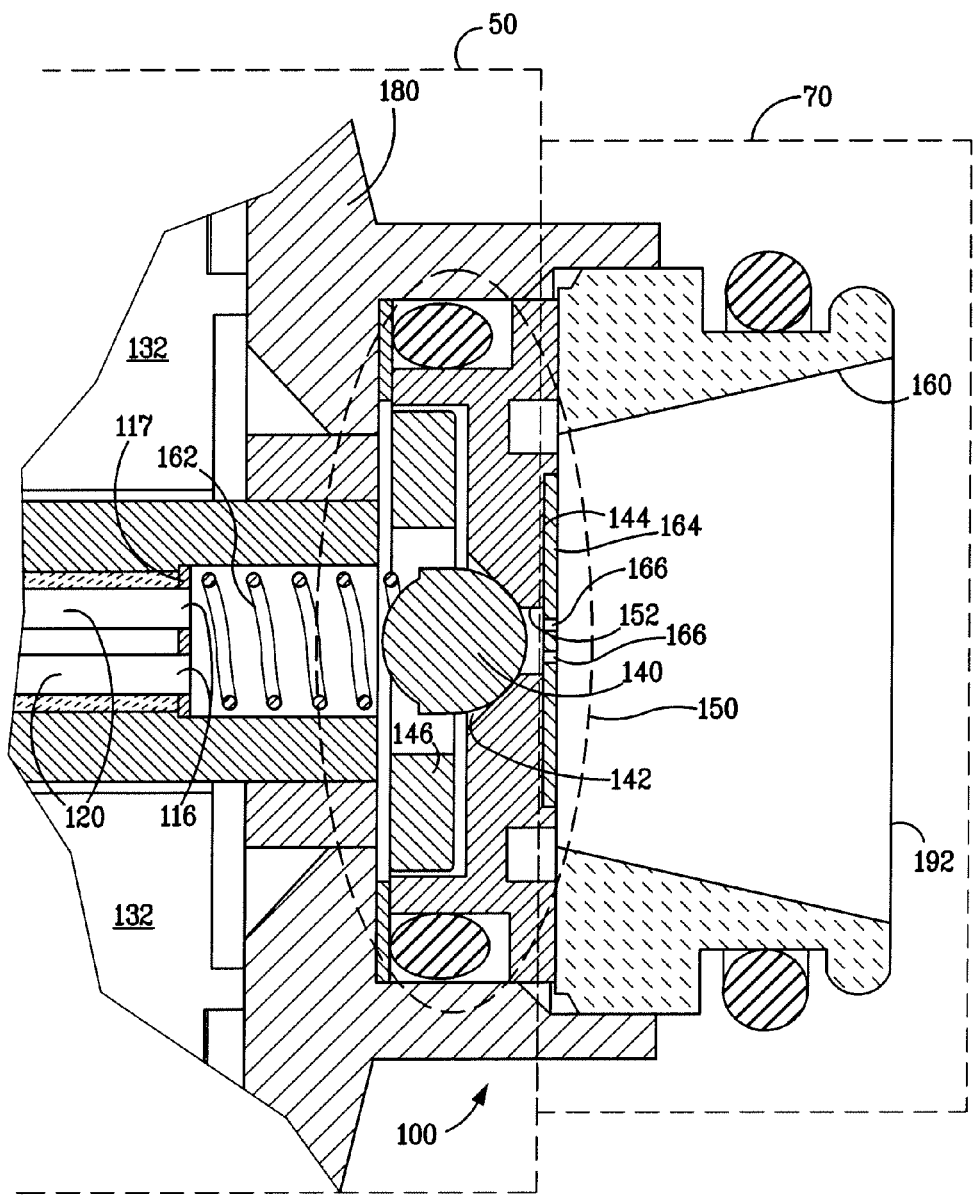

Referring, in particular, to FIGS. 8-9, a low-mass ball valve assembly 144 is operated by solenoid 128. Solenoid 128 has coil windings 132 that may be connected to electrical connectors in any conventional manner. When the coil windings 132 are energized, a magnetic field is directed through plate 146, which is connected to ball 140, thereby causing it to lift from conical sealing surface 142, exposing an orifice 152, and allowing reducing agent to flow. When electricity is cut off from the coil windings 132, a spring 162 returns the plate 146 and attached ball 140 to their original position. The spring 162 is dimensioned such that the force of the spring 162 pushing the ball 140 against the conical sealing surface 142 of the reducing agent metering system 100 is sufficient to block the flow of pressurized reducing agent in the reducing agent metering system 100.

In an alternate embodiment, a solenoid element (not shown) could be drawn into the center of coil windings 132 to lift ball 140, which could be affixed to the solenoid element. Movement of the solenoid element, caused by applying electricity to the coil windings 132, would cause the ball 140 to be drawn away from conical sealing surface 142, exposing an orifice 152, and allowing reducing agent to flow. Again, when electricity is cut off from the coil windings 132, a spring 162 returns the ball 140 to its original position.

Upon exiting the outlet ends 116 of capillary passages 112, reducing agent flow is directed toward ball valve assembly 144 of the reducing agent metering system 100. The metering section 150 consists of a solenoid operated ball-in-cone metering valve assembly 144. The act of actuating the solenoid 128 to move the plate 146 and ball 140 assembly between the open and closed position serves to meter the flow of reducing agent exiting the reducing agent metering system 100.

Upon exiting the orifice 152, the reducing agent flows through the system for delivering an atomized stream of reducing agent 70. The system for delivering an atomized stream of reducing agent 70 includes an atomizing plate 164, having a plurality of atomizing orifices 166, and a conical chimney section 160 to create the desired spray atomization and spray angle in the case of substantially liquid reducing agent sprays. The angle of the cone can span a wide range of values provided that the ball forms a seal with the surface of the cone. As may be appreciated, proper operation of reducing agent metering system 100 is possible without the inclusion of the chimney section 160.

As may be appreciated, a fundamental challenge associated with making electrical connections is ensuring a good connection at the outlet ends 116 of the capillary passages 112 of the capillary bundle 115. Other methods are believed to have utility and are within the scope of subject matter disclosed herein. For example, one wire 172 may be connected to the core material which is in electrical contact with the capillary passages 112 near the outlet ends 116. Another wire 174 is then connected to a metal piece (not the core) that is in electrical contact with the inlet ends 114 of the capillary passages 112. In another method for achieving a good electrical connection, an insulated wire is included as part of the capillary bundle 115. In this method, the electrical connections are made prior to inserting the capillary bundle 115 into the reducing agent metering system 100. As previously described, the capillary bundle 115 is surrounded by insulating material (e.g., ceramic tube 131). The insulating material is then surrounded by an electrically conducting tube, which connects to the disk 117 that is at the outlet ends 116 of the capillary bundle 115. Through this configuration, an electrical connection made at the inlet ends 114 of the capillary passages 112 results in the supply of electricity to the outlet ends 116 of the capillary bundle 115.

One preferred method of making electrical connections to the capillary bundle 115 in order to provide heat sources 120 is to use a metallic O-ring retainer 113 and a metallic disc 117 that are brazed or otherwise electrically connected to the capillaries 112. A wire is attached to intermediate housing 130 that makes electrical contact to disc 117 and another wire attached to O-ring retainer 113.

FIG. 6 illustrates an outside isometric view of a reducing agent metering system 100. Wires 176 that connect to the solenoid 128 and wires 172 and 174 that connect to the capillary bundle 115 illustrated in FIG. 6 are terminated in spade lugs. Separate connector bodies are used and disposed at approximately 90 degrees on the housing 180. Thus, the capillary heaters may be physically disconnected by disconnecting a plug without disabling the solenoid that operates the reducing agent metering system ball valve.

As may be appreciated, the ball valve assembly 144 allows vaporized reducing agent flow to be metered through a metering section 150 having low thermal inertia and minimal wetted area. These features are useful for ensuring that vaporized reducing agent delivery is achieved with a minimal temporal delay after initial power-up and also mitigate against premature recondensation of vapor as it exits the reducing agent metering system 100. This ensures that minimal droplet sizes are achieved during steady-state operation of the reducing agent metering system 100 when operated in the reducing agent vaporizer mode. Nevertheless, it should be readily recognized that the ball valve assembly 144 depicted in FIGS. 7-9 represents one of several valve designs that can be used in the design of the reducing agent metering system of the present invention. The critical features of a suitable valve design used to meter vapor are the combination of low thermal inertia and minimal wetted area. Other suitable valve designs possessing these critical features are disclosed in U.S. Pat. No. 6,820,598, filed on Jan. 15, 2003, the contents of which are hereby incorporated by reference for all that is disclosed.

Referring to FIGS. 7-8, the electric circuit used to supply heat to the capillary passages 112 consists of a power supply (not shown) and a controller (not shown), capillary bundle 115, and wires 172 and 174 attached to the capillary bundle 115 to allow resistance heating of heated section 120 of the capillary passages 112.

EXAMPLES

Laboratory bench tests were performed using a blend of 20% urea and 80% water supplied at constant pressure with a micro-diaphragm pump system to the capillaries described below. Peak droplet sizes and droplet size distributions were measured using a Spray-Tech laser diffraction system manufactured by Malvern. Droplet sizes are given in Sauter Mean Diameter (SMD). SMD is the diameter of a droplet whose surface-to-volume ratio is equal to that of the entire spray and relates to the spray's mass transfer characteristics.

The objective was to determine the feasibility of aerosolizing a solution of 20% urea and 80% water solution using a heated capillary of the type contemplated herein. The urea solution was pumped at a volumetric flow rate of 10 µL/sec through a capillary that was 35 mm long with a 35 gauge external tip.

Figure 4:
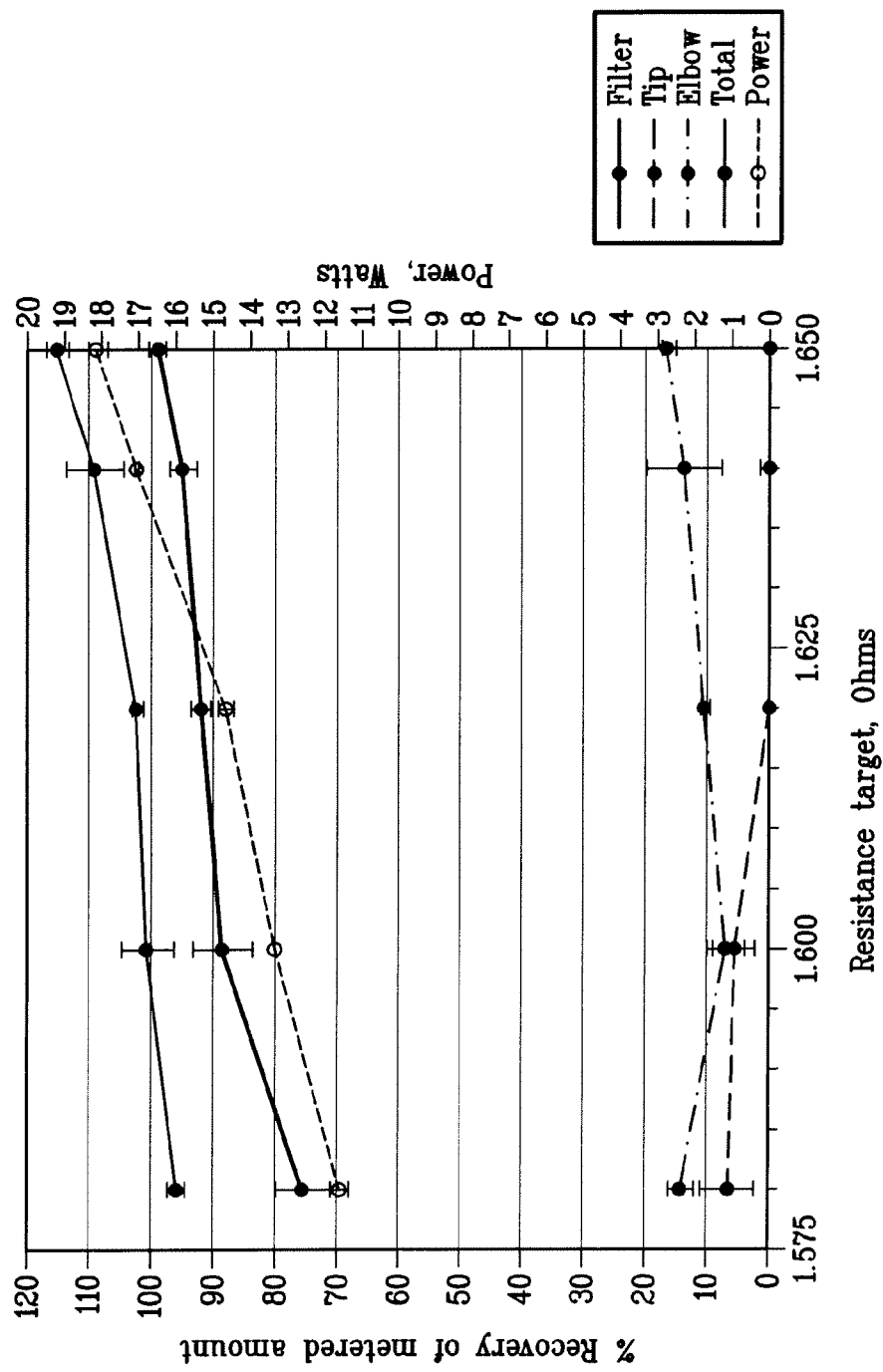

FIG. 4 shows the test results obtained during capillary heater tuning for a 5 second aerosol generation time. Triplicate runs were conducted for each resistance target. Urea was recovered using a filter element positioned downstream of the heated capillary. The urea recovered by the filter ranged from 88% to 99% of the metered amount over a power range of 13 to 18 W, indicating a high aerosolization efficiency for the system. Total recoveries as a percent of the metered amount ranged from 95.7% to 114.9% over the range of powers tested. The results were very reproducible as indicated by the low standard deviations in FIG. 4. Additionally, there were no signs of capillary clogging at the 20% urea concentration level.

Figure 5:
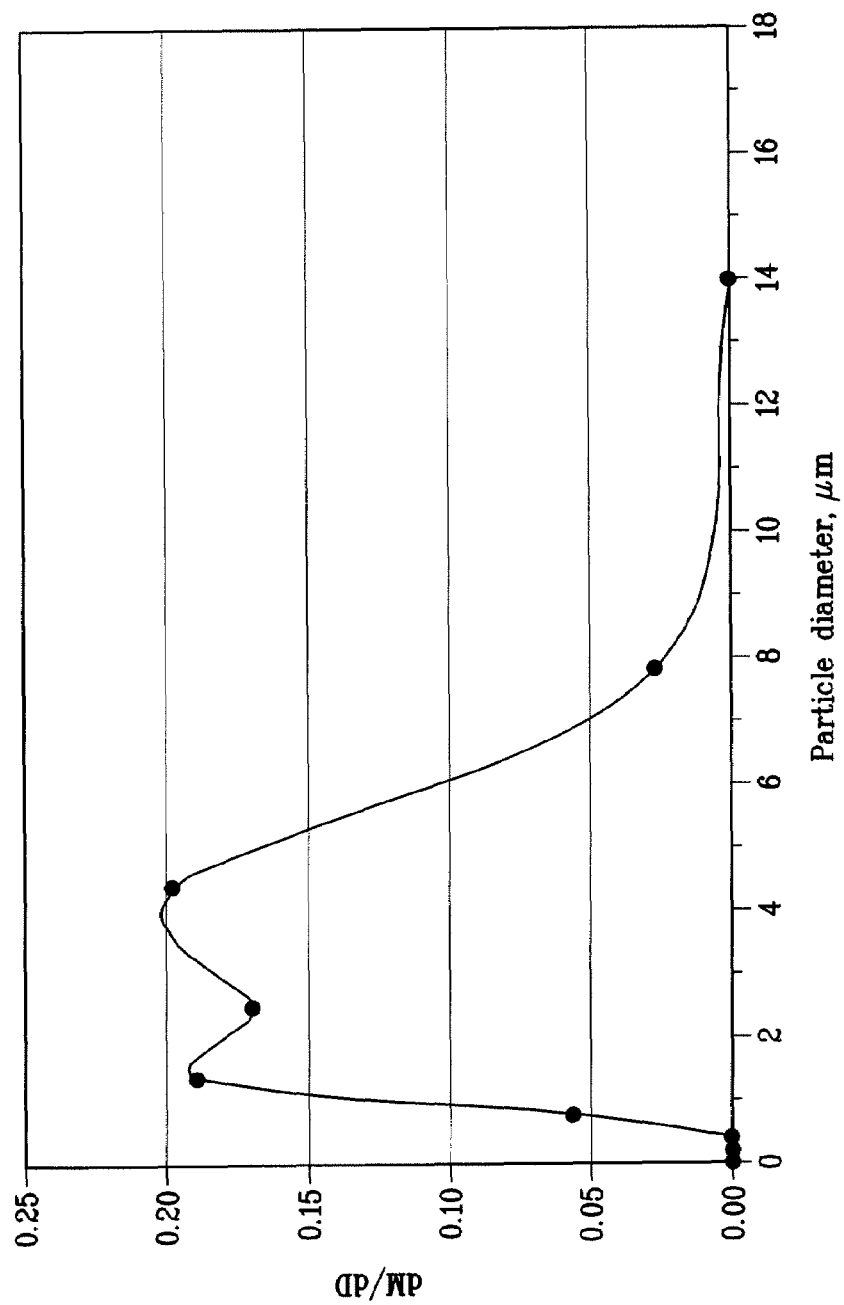

FIG. 5 shows the particle size distribution of the urea aerosol measured using a 10-stage MOUDI cascade impactor operated at an air flow rate of 30 Lpm. Triplicate impactor measurements were made at a power of 17 W. Total urea recoveries ranged from 89% to 91% indicating good mass balance and an accurate particle size distribution measurement. The average standard deviation values for urea MMAD and GSD were 3.6 (0.06) µm and 1.5 (0.02), respectively. The particle size distribution was bimodal as shown in FIG. 5.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A reducing agent metering system for use with a lean burn internal combustion engine, comprising:
   (a) a metering system housing;
   (b) a system for metering vaporized reducing agent, said system comprising (i) a plurality of capillary flow passages mounted within said metering system housing, said plurality of capillary flow passages each having an inlet end and an outlet end; and (ii) a heat source arranged alone said plurality of capillary flow passages, each said heat source operable to heat the reducing agent within said plurality of capillary flow passages to a level sufficient to change the reducing agent from a liquid state to a vapor state and deliver vaporized reducing agent from said outlet end of each said capillary flow passage, said system positioned within said metering system housing; and
   (c) a system for delivering an atomized stream of liquid reducing agent, said system positioned within said metering system housing;
   wherein the reducing agent metering system is operable to transition from metering vaporized reducing agent to delivering an atomized stream of liquid reducing agent.

2. The reducing agent metering system of claim 1, wherein said system for metering vaporized reducing agent further comprises a valve positioned within said metering system housing and proximate to each said outlet end of said plurality of capillary flow passages.

3. The reducing agent metering system of claim 2, wherein said valve is positioned downstream of each said outlet end of said plurality of capillary flow passages.

4. The reducing agent metering system of claim 3, wherein said valve is a low-mass ball valve assembly operated by a solenoid.

5. The reducing agent metering system of claim 4, wherein said low-mass ball valve assembly comprises a ball connected to a plate, the plate capable of moving as a result of a magnetic field created by actuation of said solenoid, and a conical sealing surface.

6. The reducing agent metering system of claim 5, wherein said low-mass ball valve assembly further comprises a spring dimensioned to provide a spring force operable to push said ball against said conical section and block fluid flow from the metering system.

7. The reducing agent metering system of claim 6, further comprising an exit orifice, wherein movement of said plate caused by actuation of said solenoid causes said ball to be drawn away from said conical sealing surface, allowing reducing agent to flow through said exit orifice.

8. The reducing agent metering system of claim 4, wherein said system for delivering an atomized stream of liquid reducing agent comprises an orifice plate having a plurality of orifices.

9. The reducing agent metering system of claim 8, wherein said valve of said system for metering vaporized reducing agent is operable to meter the liquid reducing agent when the reducing agent metering system transitions from metering vaporized reducing agent to delivering an atomized stream of liquid reducing agent.

10. The reducing agent metering system of claim 9, wherein said valve of said system for metering vaporized reducing agent is positioned upstream of said orifice plate.

11. The reducing agent metering system of claim 1, wherein each of said plurality of capillary flow passages is formed within a tube selected from the group consisting of stainless steel and nickel-chromium alloy.

12. The reducing agent metering system of claim 11, wherein each of said plurality of capillary flow passages has an internal diameter from about 0.020 to about 0.030 inches and a heated length of from about 1 to about 3 inches.

13. The reducing agent metering system of claim 1, wherein said heat source includes a resistance heater.

14. The reducing agent metering system of claim 13, wherein the lean burn internal combustion engine is a direct injection diesel engine.

15. The reducing agent metering system of claim 1, wherein the lean burn internal combustion engine is a direct injection gasoline engine.

16. The reducing agent metering system of claim 1, wherein the lean burn internal combustion engine is an indirect injection diesel engine.

17. The reducing agent metering system of claim 1, wherein the reducing agent comprises urea.

18. The reducing agent metering system of claim 17, wherein the reducing agent is a blend of urea and water.

19. The reducing agent metering system of claim 18, wherein the reducing agent is a volumetric blend of 20% urea and 80% water.

20. The reducing agent metering system of claim 1, further, comprising:
    (d) an exhaust passageway having a first end and a second end, said first end in communication with at least a portion of the exhaust stream of the lean burn internal combustion engine;
    (e) a deNO$_x$ catalyst positioned between said first end and said second end of said exhaust passageway;
    (f) a source of reducing agent, said source of reducing agent in fluid communication with said system for delivering an atomized stream of liquid reducing agent of the reducing agent metering system;
    (g) means for determining an operating condition of the lean burn internal combustion engine;
    (h) means for measuring the temperature of the exhaust stream within said exhaust passageway; and
    (i) a computer in communication with said operating condition determining means, said temperature measuring means and said system for metering vaporized reducing agent of the reducing agent metering system, and being capable of controlling said metering system so as to inject the NOx reducing agent into said exhaust passageway,
    wherein elements (a)-(c) of the reducing agent metering system are mounted within said exhaust passageway and upstream of said deNOx catalyst.

21. The reducing agent metering system of claim 20, wherein said system for delivering an atomized stream of liquid reducing agent comprises:
    (1) a plurality of capillary flow passages mounted within said metering system housing, said plurality of capillary flow passages having an inlet end and an outlet end; and
    (2) a heat source arranged along each of said plurality of capillary flow passages, said heat source operable to heat the reducing agent within each of said plurality of capillary flow passages to a level sufficient to change the reducing agent from a liquid state to a vapor state and deliver vaporized reducing agent from each said outlet end of plurality of capillary flow passages.

22. The reducing agent metering system of claim 20, wherein said computer controls an amount of reducing agent injected into the exhaust stream so that a predetermined amount of said reducing agent is injected.

23. The reducing agent metering system of claim 20, further comprising an oxidation catalyst mounted in said exhaust passageway downstream of said deNOx catalyst.

24. The reducing agent metering system of claim 23, further comprising a three way catalyst mounted in said exhaust passageway between said deNOx catalyst and said oxidation catalyst.

25. A method of reducing NO$_x$ emissions from an exhaust stream flowing through an exhaust passageway of a lean burn internal combustion engine having a NO$_x$ emissions reducing system, comprising the steps of:
    (a) predetermining optimized amounts for the metering of a reducing agent over a portion of an operating range of the lean burn internal combustion engine and over a range of exhaust temperatures;
    (b) positioning a deNO$_x$ catalyst in the exhaust passageway;
    (c) measuring the temperature of the exhaust stream;
    (d) determining the operating condition of the engine;
    (e) determining whether the engine is in a fully warmed condition warm;
    (f) computing an amount for a subsequent cycle time period based upon the predetermined optimized amounts, the measured temperature of the exhaust, and the determined operating condition of the lean burn internal combustion engine; and
    (g) metering the optimized amount of the reducing agent, wherein said step of metering the optimized amount of the reducing agent employs a reducing agent metering system mounted within the exhaust passageway and upstream of the deNO$_x$ catalyst, the reducing agent metering system including (i) a metering system housing; (ii) a system for metering vaporized reducing agent, the system positioned within the metering system housing; and (iii) a system for delivering an atomized stream of liquid reducing agent, the system positioned within said metering system housing the reducing agent metering system operable to transition from metering vaporized reducing agent to delivering an atomized stream of liquid reducing agent in response to said step of determining whether the engine is in a fully warmed condition
    wherein the system for metering vaporized reducing agent comprises:
    (1) a plurality of capillary flow passages mounted within said metering system housing, said plurality of capillary flow passages having an inlet end and an outlet end; and
    (2) a heat source arranged along each of said plurality of capillary flow passages, said heat source operable to heat the reducing agent within each of said plurality of capillary flow passages to a level sufficient to change the reducing agent from a liquid state to a vapor state and deliver vaporized reducing agent from each said outlet end of plurality of capillary flow passages.

26. The method of reducing NO$_x$ emissions of claim 25, wherein said optimized amounts are predetermined empirically for a given lean burn internal combustion engine.

27. The method of reducing NO$_x$ emissions of claim 25, further comprising the step of:
    (h) storing the predetermined optimized amounts in a memory location accessible to a computer that performs said computing step.

28. The method of reducing NO$_x$ emissions of claim 27, wherein said computing step includes the steps of:
    (i) accessing said memory location;
    (ii) choosing which optimized amount corresponds most closely to the measured temperature of the exhaust and the determined operating condition of the combustion source; and
    (iii) controlling the reducing agent metering system to deliver the optimized amount of reducing agent into the exhaust stream.

29. An automobile, comprising:
    (a) a lean burn internal combustion engine positioned within an automobile body; and
    (b) a system for reducing NO$_x$ emissions from an exhaust stream of a lean burn internal combustion engine, including:

(i) an exhaust passageway having a first end and a second end, said first end in communication with at least a portion of the exhaust stream of the lean burn internal combustion engine;

(ii) a deNO$_x$ catalyst positioned between said first end and said second end of said exhaust passageway;

(iii) a reducing agent metering system mounted within said exhaust passageway and upstream of said deNOx catalyst, said reducing agent metering system including (1) a metering system housing; (2) a system for metering vaporized reducing agent, said system comprising (2a) a plurality of capillary flow passages mounted within said metering system housing, each of said plurality of flow passages having an inlet end and an outlet end; and (2b) a heat source arranged along each of said plurality of capillary flow passages, said heat source operable to heat the reducing agent within each of said plurality of capillary flow passages to a level sufficient to change the reducing agent from a liquid state to a vapor state and deliver vaporized reducing agent from each said outlet end of said plurality of capillary flow passages, said system positioned within said metering system housing; and (3) a system for delivering an atomized stream of liquid reducing agent, said system positioned within said metering system housing;

(iv) a source of reducing agent, said source of reducing agent in fluid communication with said reducing agent metering system;

(v) means for determining an operating condition of the lean burn internal combustion engine;

(vi) means for measuring the temperature of the exhaust stream within said exhaust passageway; and (vii) a computer in communication with said operating condition determining means, said temperature measuring means and said reducing agent metering system, and being capable of controlling said metering system so as to inject the NOx reducing agent into said exhaust passageway.

\* \* \* \* \*